United States Patent
Okita

(10) Patent No.: US 9,682,703 B2
(45) Date of Patent: Jun. 20, 2017

(54) DRIVING SUPPORT DEVICE AND DRIVING SUPPORT METHOD

(71) Applicant: Toshinori Okita, Gotenba (JP)

(72) Inventor: Toshinori Okita, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 109 days.

(21) Appl. No.: 14/438,026

(22) PCT Filed: Oct. 26, 2012

(86) PCT No.: PCT/JP2012/077712
§ 371 (c)(1),
(2) Date: Apr. 23, 2015

(87) PCT Pub. No.: WO2014/064831
PCT Pub. Date: May 1, 2014

(65) Prior Publication Data
US 2015/0291158 A1   Oct. 15, 2015

(51) Int. Cl.
*B60W 30/08* (2012.01)
*B62D 15/02* (2006.01)
(Continued)

(52) U.S. Cl.
CPC .............. *B60W 30/08* (2013.01); *B60R 21/00* (2013.01); *B60T 8/17558* (2013.01);
(Continued)

(58) Field of Classification Search
None
See application file for complete search history.

(56) References Cited

U.S. PATENT DOCUMENTS 6,859,731 B2 * 2/2005 Takafuji .............. B60R 21/0132
                                                  180/167
7,016,783 B2 * 3/2006 Hac .................... B60K 31/0008
                                                  180/167
(Continued)

FOREIGN PATENT DOCUMENTS

JP     2007-145152 A    6/2007
JP     2008-308036 A   12/2008
(Continued)

OTHER PUBLICATIONS

WO2008020076A1_translation.pdf used as translation for WO2008020076A1. Translation obtained from ESPACE.net on Oct. 6, 2016.*

*Primary Examiner* — Rami Khatib
*Assistant Examiner* — Jeffrey Boomer
(74) *Attorney, Agent, or Firm* — Sughrue Mion, PLLC

(57) ABSTRACT

A driving support device performs collision avoidance support on a vehicle relative to a leading vehicle present in a travelling direction based on a time-to-collision Ta as a time that the vehicle takes to collide with the leading vehicle. A lateral change amount calculation portion detects relative lateral velocity Vy, which is a relative time-dependent change amount between the vehicle and the leading vehicle. A storage portion stores steering time T1, which is a time required for the vehicle to avoid the leading vehicle by steering. The storage portion stores activation threshold TH1, which is a threshold to determine activation of the driving support based on the relative lateral velocity Vy. When a relative lateral velocity Vy at a time when the time-to-collision Ta is the steering time T1 or more is the activation threshold TH1 or more, a support management portion restrains the activation of the driving support.

10 Claims, 11 Drawing Sheets

(51) Int. Cl.

| | | |
|---|---|---|
| *B60W 40/114* | (2012.01) | |
| *B60W 40/105* | (2012.01) | |
| *G08G 1/16* | (2006.01) | |
| *B60T 8/1755* | (2006.01) | |
| *B60R 21/00* | (2006.01) | |
| *B60W 30/09* | (2012.01) | |

(52) U.S. Cl.
CPC .......... *B60W 30/09* (2013.01); *B60W 40/105* (2013.01); *B60W 40/114* (2013.01); *B62D 15/0265* (2013.01); *G08G 1/165* (2013.01); *G08G 1/166* (2013.01); *B60W 2510/18* (2013.01); *B60W 2510/20* (2013.01); *B60W 2520/14* (2013.01)

(56) References Cited

U.S. PATENT DOCUMENTS

| | | | | |
|---|---|---|---|---|
| 2007/0129891 | A1 | 6/2007 | Yano et al. | |
| 2008/0281521 | A1* | 11/2008 | Shirato | B60T 7/22 701/301 |
| 2012/0101713 | A1* | 4/2012 | Moshchuk | B60W 10/184 701/301 |
| 2013/0110370 | A1* | 5/2013 | Inomata | B60K 31/0008 701/70 |
| 2013/0173132 | A1* | 7/2013 | Yuasa | B60T 7/22 701/70 |
| 2013/0218396 | A1* | 8/2013 | Moshchuk | B60W 50/08 701/25 |
| 2014/0032049 | A1* | 1/2014 | Moshchuk | B62D 15/0265 701/42 |
| 2014/0032093 | A1* | 1/2014 | Mills | B60W 40/107 701/301 |
| 2014/0229069 | A1* | 8/2014 | Akiyama | B60T 7/12 701/41 |
| 2014/0350813 | A1* | 11/2014 | Jeon | B60W 30/09 701/70 |
| 2015/0232090 | A1* | 8/2015 | Jeon | B60T 7/12 701/41 |
| 2015/0251656 | A1* | 9/2015 | Yester | B60W 30/09 701/41 |

FOREIGN PATENT DOCUMENTS

| | | |
|---|---|---|
| JP | 2011-197915 A | 10/2011 |
| JP | 2012-106592 A | 6/2012 |
| WO | 2005/082681 A1 | 9/2005 |
| WO | 2008/020076 A1 | 2/2008 |
| WO | WO 2008020076 A1 * | 2/2008 ................ B60T 7/22 |

* cited by examiner

FIG. 13
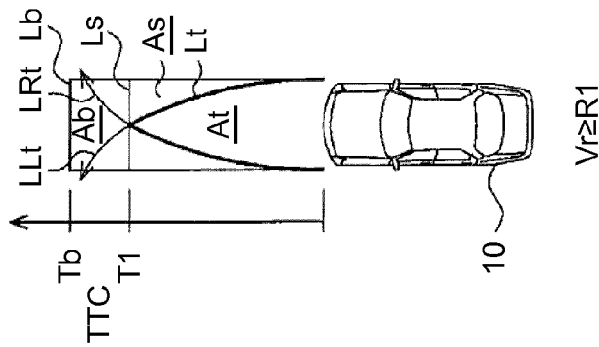
FIG. 14
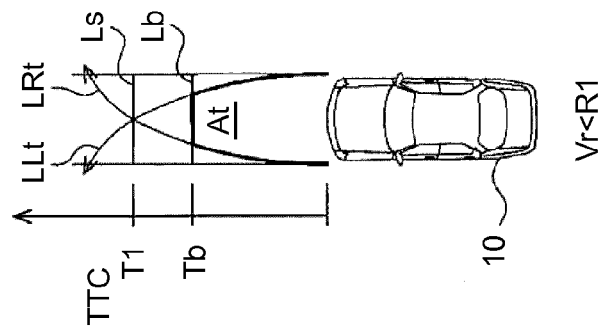
FIG. 15
| | RELATIVE LATERAL VELOCITY [m/s] | |
| --- | --- | --- |
| | SMALL (ACTIVATION THRESHOLD TH1) | LARGE (LEVEL THRESHOLD TH2) |
| SUPPRESSION PERIOD | SHORT PERIOD | LONG PERIOD |

FIG. 16

| OPERATION CYCLE | RELATIVE LATERAL VELOCITY [m/s] |
|---|---|
| 1 | 2.1 |
| 2 | 2.1 |
| 3 | 2.0 |
| 4 | 2.1 |
| 5 | 0.1 |
| 6 | 2.2 |
| 7 | 2.1 |
| 8 | 2.2 |
| 9 | 2.1 |
| 10 | 2.1 |
| 11 | 2.1 |

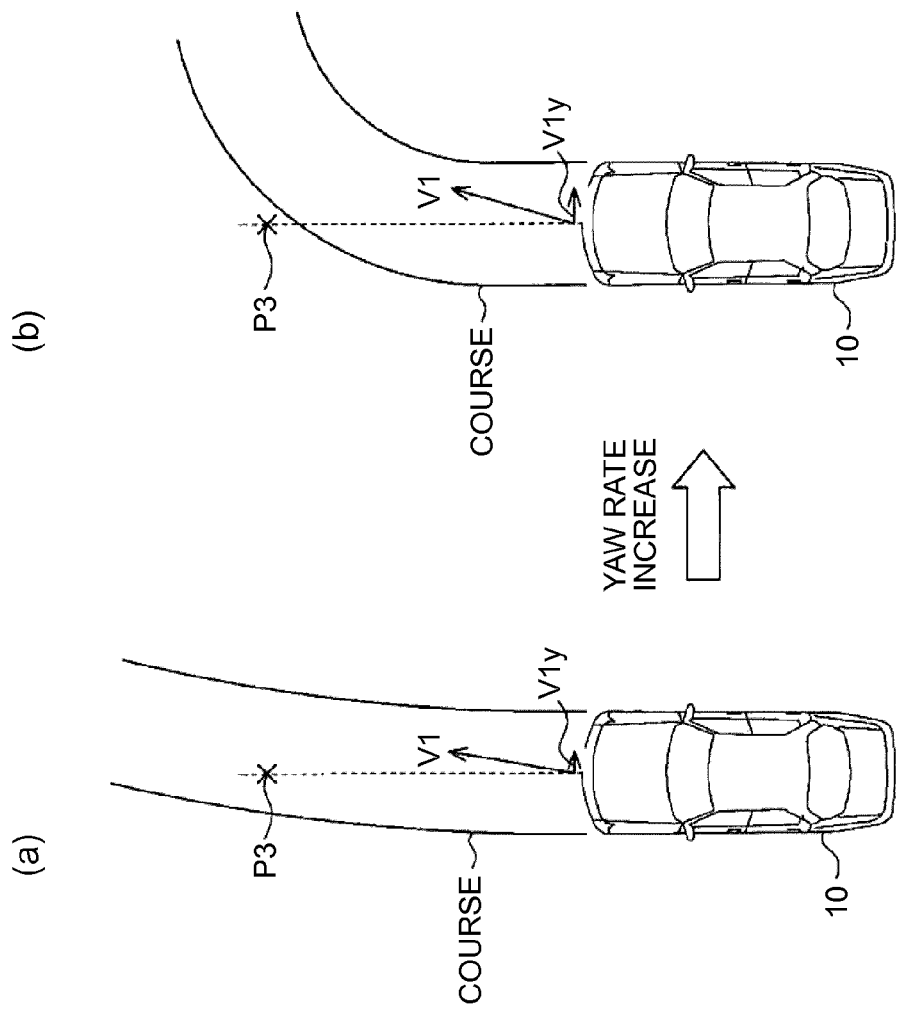

FIG. 19

| | | THRESHOLD TO BE COMPARED WITH RELATIVE LATERAL VELOCITY |
|---|---|---|
| DISTANCE TO OBJECT | SHORT | Td1 |
| | MEDIUM | Td2 |
| | LONG | Td3 |

Td1<Td2<Td3

DRIVING SUPPORT DEVICE AND DRIVING SUPPORT METHOD

TECHNICAL FIELD

The present invention relates to a driving support device and a driving support method for performing a driving support to avoid collision between a vehicle and an object.

BACKGROUND ART

Generally, the above driving support device acquires, from an in-vehicle sensor such as an in-vehicle radar, a relative state, to a host vehicle, of an object which is present in a travelling direction of a vehicle and which requires a deceleration control of the vehicle. The object is a parking vehicle, a leading vehicle, or an oncoming vehicle, for example. Based on the acquired relative relationship between the object and the host vehicle, a driving support such as an alarm tone or intervention braking is performed.

Conventionally, there has been known a device described in Patent Document 1 as an example of the driving support device. A rear-end collision alarming device described in Patent Document 1 includes: alarm generation means that generates an alarm when a time-to-collision of a host vehicle with a leading vehicle is a threshold or less; leading vehicle lane-changing determination means that determines whether or not the leading vehicle changes lanes; and timing adjusting means that delays a timing of the alarm to be generated by the alarm generation means when it is determined that the leading vehicle changes lanes. The leading vehicle lane-changing determination portion finds an acceleration of the host vehicle and an overlap ratio indicative of a ratio of how much the host vehicle and the leading vehicle overlap with each other in a vehicle width direction, and then determines, based on the values thus found and thresholds, whether or not the leading vehicle changes lanes. When the overlap ratio is the threshold or less and the acceleration of the host vehicle is the threshold or more, the timing adjusting means adjusts a value of a threshold to be compared with the time-to-collision so that the value is smaller than a normal value. The reason is as follows. When the overlap ratio is the threshold or less and the acceleration of the host vehicle is the threshold or more, a driver intentionally approaches the leading vehicle so that the host vehicle overtakes the leading vehicle that changes a lane to an adjacent lane, so that the risk of collision is lower than a case of approach of normal driving and the timing to generate an alarm can be delayed.

As such, by performing the adjustment to delay the timing to generate an alarm based on a low possibility of collision, unnecessary generation of an alarm can be reduced and uncomfortable feeling of the driver can be reduced.

CITATION LIST

Patent Document

Patent Document 1: Japanese Patent Application Publication No. 2011-197915 (JP 2011-197915 A)

SUMMARY OF THE INVENTION

Problem to be Solved by the Invention

In the meantime, the overlap ratio of the host vehicle to the leading vehicle may be changed due to changes in a shape of lanes, such as a shape of a road, e.g., a curved road, and the increase and decrease of lanes. For example, the rear-end collision alarming device described in Patent Document 1 and the like devices cannot distinguish appropriately whether the leading vehicle runs on a curved road or changes lanes. Because of this, the management of activation of a driving support becomes vague, which may result in that the uncomfortable feeling of the driver cannot be reduced.

The present invention has been accomplished in consideration of the above-mentioned circumstances. An object of the present invention is to provide a driving support device and a driving support method each of which can more appropriately manage the necessity of a driving support related to collision avoidance and each of which can effectively restrain unnecessary activation of the driving support.

Means for Solving the Problem

The following describes means for solving the problem and effects thereof.

A driving support device to achieve the above object is a driving support device that performs a driving support on a vehicle to avoid collision with an object present in a travelling direction of the vehicle based on a time-to-collision as a time that the vehicle and the object take to collide with each other, and the driving support device includes: a lateral change detection portion that takes a relative time-dependent change amount between the vehicle and the object in a lateral direction perpendicular to the travelling direction of the vehicle; a first storage portion in which a steering time is stored as a time required for the vehicle to avoid the object by steering; a second storage portion in which an activation threshold is stored as a threshold used to determine activation of the driving support based on the lateral relative time-dependent change amount thus detected; and a support management portion that restrains the activation of the driving support at a time when the lateral relative time-dependent change amount detected when the time-to-collision is the steering time or more is the activation threshold or more.

A driving support method to achieve the above object is a driving support method for performing a driving support on a vehicle to avoid collision with an object present in a traveling direction of the vehicle based on a time-to-collision as a time that the vehicle and the object take to collide with each other, and the driving support method includes: a lateral change detection step of detecting a relative time-dependent change amount between the vehicle and the object in a lateral direction perpendicular to the travelling direction of the vehicle; and a support management step of restraining activation of the driving support based on a steering time which is stored in a storage portion and which is a time required for the vehicle to avoid the object by steering, and an activation threshold that is a threshold used to determine the activation of the driving support based on the lateral relative time-dependent change amount thus detected, the activation of the driving support being restrained at a time when the lateral relative time-dependent change amount detected when the time-to-collision is the steering time or more is the activation threshold or more.

According to such a configuration or method, it is determined, based on the lateral relative time-dependent change amount of the object, whether or not the activation of the driving support related to collision avoidance is restrained. In a case of the driving support related to collision avoidance, if a relative position of the object to the vehicle laterally leaves the traveling direction of the vehicle, a possibility of collision between the vehicle and the object is low, so that the necessity to activate the driving support is low. In view of this, the relative time-dependent change amount of the object is compared with the activation threshold, and when the relative time-dependent change amount of the object is larger than the activation threshold and the possibility of collision is low, the activation of the driving support related to collision avoidance is restrained. Hereby, in a case where a driver considers that the support is unnecessary, e.g., in a case where the driver performs an avoidance operation by steering or a leading vehicle changes lanes, the activation of the driving support is restrained, thereby reducing such a possibility that the driver feels troublesome.

In a case where the lateral relative time-dependent change amount is used for determination on whether or not the driving support related to collision avoidance is restrained, even if lateral positions of the leading vehicle and the vehicle, both running on the same road, deviate from each other due to a curve or the like, the lateral relative time-dependent change amount is small, but when the lateral positions of the leading vehicle and the vehicle deviate from each other due to lane changing, the lateral relative time-dependent change amount is large. Accordingly, it is possible to distinguish the lane changing from the curve or the like, appropriately.

As a preferable configuration, the lateral change detection portion detects a relative lateral velocity that is a relative moving velocity of the object in the lateral direction, as the lateral relative time-dependent change amount between the vehicle and the object.

According to such a configuration, the time-dependent change amount between the vehicle and the object is detected based on a relative lateral velocity. If the relative lateral velocity of the object is small, it can be estimated that the object does not leave the traveling direction of the vehicle, and if the relative lateral velocity is large, it can be estimated that the object leaves the traveling direction of the vehicle. The relative lateral velocity which is between the vehicle and the object running on the same road falls within a predetermined range, so it is possible to distinguish the change due to the shape of the road such as a curve from the change due to lane changing, appropriately.

As preferable configuration, the driving support device further includes a braking time acquisition portion that acquires a braking time that is a time required for the vehicle to perform collision avoidance by braking, and the support management portion restrains the activation of the driving support, with a proviso that the lateral relative time-dependent change amount detected when the time-to-collision is the steering time or more is the activation threshold or more, and the time-to-collision is less than the braking time.

According to such a configuration, even in a case where collision avoidance is difficult by normal braking, if the driver performs an avoidance operation by steering or if the leading vehicle changes lanes, the activation of the driving support can be restrained. Hereby, that activation of the driving support which causes the driver to feel troublesome is reduced.

As a preferable configuration, the braking time acquisition portion acquires the braking time based on a relative velocity between the vehicle and the object.

According to such a configuration, since the braking time that is largely affected by the relative velocity is obtained based on the relative velocity, an appropriate braking time can be obtained. Such a braking time can be selected from a table or a map determined in association with the relative velocity, or may be calculated by applying the relative velocity to a predetermined function.

As a preferable configuration, the support management portion adjusts a period during which the activation of the driving support is restrained, based on a magnitude of the relative time-dependent change amount detected by the lateral change detection portion.

According to such a configuration, a period during which the activation of the driving support is restrained is adjusted based on the lateral relative time-dependent change amount. Hereby, a suppression period during which the driving support is restrained is adjusted appropriately.

As a preferable configuration, the period during which the activation of the driving support is restrained is adjusted to be longer as a magnitude of the relative time-dependent change amount detected by the lateral change detection portion is larger.

According to such a configuration, if the lateral relative time-dependent change amount is large, the object is highly likely to leave a course of the vehicle. Accordingly, if a possibility of the leaving the course is high, the suppression period is extended, thereby making it possible to reduce such a possibility that the driving support to cause a driver to feel troublesome is activated.

As a preferable configuration, the vehicle includes a yaw rate sensor that detects a velocity at which a rotation angle in a turning direction of the vehicle changes, and the lateral change detection portion corrects the detected relative time-dependent change amount of the object based on the detected velocity at which the rotation angle changes.

According to such a configuration, the lateral relative time-dependent change amount is corrected based on that traveling direction (orientation) of the vehicle which is changed by a steering operation or the like. By correcting the relative time-dependent change amount by the change in the traveling direction of the vehicle, response for the detection of the lateral relative time-dependent change amount of the object can be improved. For example, in comparison with a sensor that measures a vehicle state, that relative time-dependent change amount of the object which is detected based on a radar or the like with a low response naturally has a low response. In view of this, by using a measurement result of a sensor having a high response and measuring a vehicle state such as a yaw rate sensor, it is possible to achieve a high response of the relative time-dependent change amount of the object.

As a preferable configuration, a target region that is a region sectioned by movement loci of right and left tip ends of the vehicle in accompany with steering of the vehicle over the steering time is present ahead of the vehicle in the traveling direction, and the support management portion replaces the steering time as a standard of the time-to-collision, with a time obtained according to a position at which the object enters the target region, on the occasion of determination on the restraint of the activation of the driving support.

According to such a configuration, in consideration of a turning characteristic of the vehicle, the steering time to be compared with the time-to-collision is replaced with the time to be obtained according to the position at which the object enters the target region. The time to be replaced is longest at a vehicle width center of the vehicle, and is a steering time, for example. The time to be replaced becomes shorter toward a side away from the vehicle width center. This allows the activation of the driving support related to collision avoidance to be delayed appropriately. That is, the vehicle has a width, and in consideration of the turning characteristic of the vehicle, the collision avoidance from the object can be performed even in a state where the vehicle is closer to the object at a time when the object is at a position that is away from the vehicle width center, as compared with a case where the object is at the vehicle width center. Accordingly, the activation of the driving support of the vehicle with respect to the object at a position that is away from the vehicle width center can be restrained based on the relative lateral velocity even in such a state where the vehicle is closer to the object, as compared with the object at the vehicle width center. Hereby, that activation of the driving support which causes a driver to feel troublesome can be restrained still more.

As a preferable configuration, a relative lateral acceleration that is a relative acceleration at a time when the object moves in the lateral direction relative to the vehicle is used together as the relative time-dependent change amount detected by the lateral change detection portion.

According to such a configuration, the time-dependent change amount can be detected more quickly, so that the determination on whether or not the driving support is restrained is performed more appropriately.

BRIEF DESCRIPTION OF THE DRAWINGS

FIG. 10(a) is a schematic view illustrating that a position (P1) indicative of a relationship between a relative velocity and a time-to-collision (TTC) is placed in a second region; and FIG. 10(b) is a schematic view illustrating corresponding positions to a braking time (Lb) and a turning time (Ls) ahead of the vehicle in the travelling direction.

FIG. 12(a) is a schematic view illustrating a relationship between a relative velocity and a time-to-collision (TTC); FIG. 12(b) is a schematic view illustrating a region (At) which is ahead of the vehicle in the travelling direction and which is sectioned by movement loci of right and left tip ends of a vehicle in accompany with steering over a steering time; and FIG. 12(c) is a graph illustrating a region which is ahead of the vehicle in the traveling direction and which is sectioned by a steering time (T1).

FIG. 13 is a relationship diagram illustrating the graph illustrated in FIG. 12 and a relationship between the vehicle and the region ahead of the vehicle in its travelling direction.

FIG. 14 is a relationship diagram illustrating the graph illustrated in FIG. 12 and a relationship between the vehicle and the region ahead of the vehicle in its travelling direction.

FIG. 15 is a list showing, in a table, settings of a magnitude of a relative lateral velocity and a length of a suppression period in regard to a third embodiment that embodies a driving support device.

FIG. 16 is a list showing, in a table, examples of a relative lateral velocity detected in the driving support device corresponding to FIG. 15.

FIG. 17 is a schematic view illustrating a magnitude of turning of a vehicle and a positional relationship with an object in regard to a fourth embodiment that embodies a driving support device: FIG. 17(a) is a schematic view illustrating a positional relationship when the turning of the vehicle is small; and FIG. 17(b) is a schematic view illustrating a positional relationship when the turning of the vehicle is large.

FIG. 18 is a table showing a case of setting thresholds to be compared with a relative lateral velocity according to a type of an object in regard to another embodiment that embodies a driving support device.

FIG. 19 is a table showing a case of setting thresholds to be compared with a relative lateral velocity according to a distance to an object in regard to further another embodiment that embodies a driving support device.

MODES FOR CARRYING OUT THE INVENTION

First Embodiment

The first embodiment that embodies a driving support device and a driving support method is described with reference to FIGS. 1 to 10.

Figure 1:
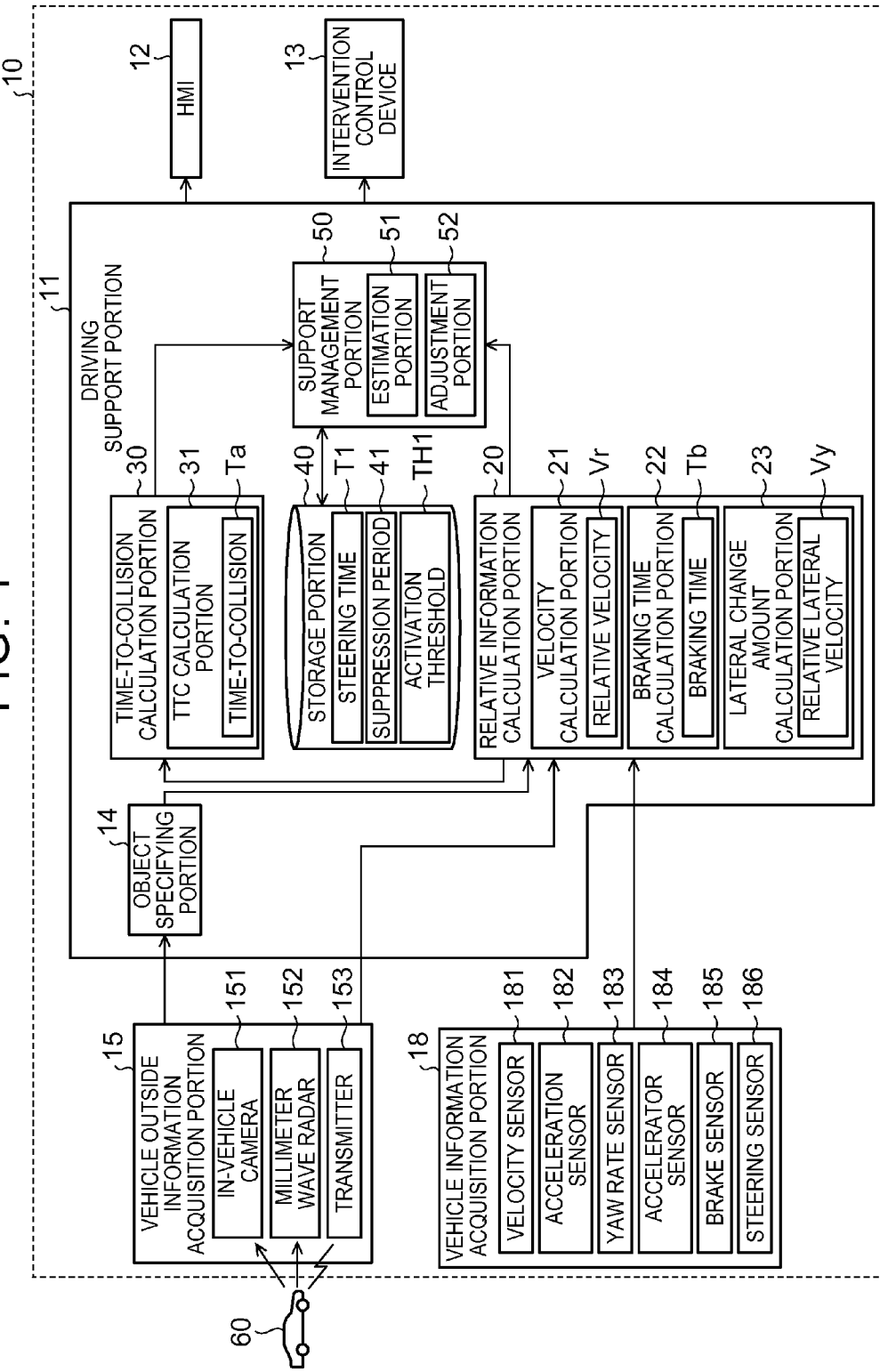
FIG. 1 is a block diagram illustrating a schematic configuration of a first embodiment that embodies a driving support device.

As illustrated in FIG. 1, a vehicle 10 to which the driving support device and the driving support method are applied includes a driving support portion 11 that provides various driving supports to the vehicle 10. Further, the vehicle 10 includes: a HMI (human machine interface) 12 that notifies a driver of a content of a driving support; and an intervention control device 13 that assists a vehicle operation. The driving support portion 11 is connected to the HMI 12 and the intervention control device 13 so as to be able to transmit various information thereto.

The driving support portion 11 detects an object such as a movable body or a stationary object as a target to be avoided in a collision avoidance support, and activates the collision avoidance support on the object thus detected. The collision avoidance support is a driving support, such as a pre-crash system (PCS), activated in the vehicle 10 to avoid collision with the object, for example, and is a driving support related to collision avoidance. Examples of the movable body detected by the driving support portion 11 include a leading vehicle 60, an oncoming vehicle, and a pedestrian, and examples of the stationary object include a parking vehicle, a pole, and a guardrail. Note that, in the present embodiment, the following description deals with the leading vehicle 60 as the object for purposes of this description, but the object is not limited to the leading vehicle 60. Note that the activation of the driving support related to collision avoidance is to output a warning instruction signal to instruct the driving support from the driving support portion 11 to the HMI 12, or to output an intervention control signal to instruct the driving support from the driving support portion 11 to the intervention control device 13. Further, the activation of the driving support related to collision avoidance can be known from that driving support related to collision avoidance which is output from the HMI 12 or the intervention control device 13.

The vehicle 10 includes: a vehicle outside information acquisition portion 15 that acquires vehicle outside information around the vehicle 10; and a vehicle information acquisition portion 18 that acquires various information of the vehicle 10 as vehicle information. The vehicle outside information acquisition portion 15 and the vehicle information acquisition portion 18 are connected to the driving support portion 11 so as to be able to transmit various information thereto.

The vehicle outside information acquisition portion 15 is provided in the vehicle 10. The vehicle outside information acquisition portion 15 includes: an in-vehicle camera 151 that captures a surrounding environment of the vehicle 10, including the leading vehicle 60 and the like; and a millimeter wave radar 152 that detects an object present around the vehicle 10, including the leading vehicle 60 and the like. Further, the vehicle outside information acquisition portion 15 includes a transmitter 153 having a function to perform radio communication with a communication device or the like outside the vehicle.

The in-vehicle camera 151 captures a predetermined range ahead of the vehicle 10 by means of a CCD camera or the like provided on a backside of a rearview mirror. The in-vehicle camera 151 outputs an image signal based on a captured image thus captured, to the driving support portion 11.

The millimeter wave radar 152 has, for example, a distance measurement function to measure a distance, e.g., an inter-vehicle distance L (see FIG. 2), between the vehicle 10 and the leading vehicle 60 as an object present in a travelling direction of the vehicle 10, and a velocity measurement function to measure a relative velocity Vr (see FIG. 2) between the leading vehicle 60 and the vehicle 10. When the millimeter wave radar 152 detects the leading vehicle 60 present in the travelling direction of the vehicle 10, the millimeter wave radar 152 outputs, to the driving support portion 11, a signal including information of the leading vehicle 60 thus detected.

The transmitter 153 acquires information indicative of a velocity and a position of other vehicles via vehicle-to-vehicle communication with the other vehicles including the leading vehicle 60 present around the vehicle 10, for example. The transmitter 153 outputs the information thus acquired to the driving support portion 11. Further, the transmitter 153 performs road-to-vehicle communication with an optical beacon antenna provided as a road facility. The transmitter 153 acquires an infrastructure information signal related to the road facility or the like via the road-to-vehicle communication with the optical beacon antenna. When the transmitter 153 receives the infrastructure information signal, the transmitter 153 outputs the infrastructure information signal thus received, to the driving support portion 11. Note that the infrastructure information signal includes, for example, a distance to an intersection, a signal cycle of a traffic light provided at the intersection, and a road shape, and a traffic condition of a road provided with the optical beacon antenna (including an intersection shape, a curvature, a gradient, and the number of traffic lanes). Also, the infrastructure information signal includes accompanying information accompanying the road, and information of a movable body such as other vehicles around the intersection detected by the ground facility or the like.

That is, the vehicle outside information output from the vehicle outside information acquisition portion 15 includes various information including information based on which a type of an object can be distinguished.

The vehicle information acquisition portion 18 is provided in the vehicle 10. The vehicle information acquisition portion 18 includes a velocity sensor 181, an acceleration sensor 182, a yaw rate sensor 183, an accelerator sensor 184, a brake sensor 185, and a steering sensor 186.

The velocity sensor 181 detects a rotation speed of a wheel assembly of the vehicle 10, and outputs a signal corresponding to the rotation speed thus detected to the driving support portion 11.

The acceleration sensor 182 detects an acceleration of the vehicle 10, and outputs a signal corresponding to the acceleration thus detected to the driving support portion 11.

The yaw rate sensor 183 detects a velocity at which a rotation angle of the vehicle 10 to its turning direction is changed, and outputs a signal corresponding to a yaw rate thus detected to the driving support portion 11.

The accelerator sensor 184 detects whether or not a driver operates an accelerator pedal, and detects a stepping-in amount of the pedal. Further, the accelerator sensor 184 outputs, to the driving support portion 11, a signal corresponding to whether or not the driver operates and a signal corresponding to the stepping-in amount thus detected.

The brake sensor 185 detects whether or not the driver operates a brake pedal, and detects a stepping-in amount of the pedal. Further, the brake sensor 185 outputs, to the driving support portion 11, a signal corresponding to whether or not the driver operates and a signal corresponding to the stepping-in amount thus detected.

The steering sensor 186 detects an operation amount (a steering angle) of steering by the driver, and outputs a signal corresponding to the operation amount (steering angle) thus detected to the driving support portion 11.

The HMI 12 is a device that outputs an image or an audio recognizable by the driver. The image can include at least one of a static image and a moving image, and the audio can include at least one of a simple sound such as alarm tone, and an audio guidance. The HMI 12 includes at least one of an audio station, a monitor of a navigation system, a meter panel, a head up display, and the like. Further, the HMI 12 may be constituted by only a screen, only a speaker, or only a buzzer. When a warning instruction signal is input into the HMI 12 from the driving support portion 11, a content corresponding to the warning instruction signal thus input is output as information recognizable by the driver. The HMI 12 performs a driver support such as a deceleration control or a steering control by outputting information recognizable by the driver who performs such a control based on the warning instruction signal.

The deceleration control includes notifying, by sound or display, that an inter-vehicle distance L becomes short or that a person is present ahead of the vehicle in the travelling direction. The steering control includes notifying a lane departure warning by sound or display.

The intervention control device 13 is a device that performs assistance (support) about one or more of braking and steering of the vehicle 10. When an intervention control signal is input therein from the driving support portion 11, the intervention control device 13 assists the braking or steering based on the intervention control signal thus input. The intervention control device 13 is constituted by various control devices such as a brake control device that controls a brake actuator of the vehicle 10, an engine control device that controls an engine, and a steering control device that controls a steering actuator.

That is, the intervention control device 13 performs a deceleration control and a steering control based on the intervention control signal input from the driving support portion 11.

Examples of the deceleration control include restraint of the engine speed, stopping (fuel cut) of fuel supply to the engine, a brake assist control, and a pre-crash brake control. For example, the velocity of the vehicle 10 can be reduced by controlling the brake control device and the like. By such a deceleration control, the inter-vehicle distance is secured and an appropriate speed is maintained.

Examples of the steering control include a lane keeping assist (LKA) to prevent the vehicle 10 from deviating from a lane recognized, and the like. By such a steering control, lane departure warning by a small steering effort with a short time, lane keeping by a continuous small steering effort, and the like are performed.

Next will be described the driving support portion 11.

The driving support portion 11 performs a collision avoidance support as the driving support related to collision avoidance relative to an object as a target to be avoided by the vehicle 10. The driving support portion 11 includes: an object specifying portion 14 that specifies the object as the target to be avoided; a relative information calculation portion 20 that calculates relative information between the vehicle 10 and the leading vehicle 60; and a time-to-collision calculation portion 30 that calculates a time-to-collision Ta used for the collision avoidance support. Further, the driving support portion 11 includes: a storage portion 40 serving as a first storage portion and a second storage portion that store therein various information used for the collision avoidance support and the like; and a support management portion 50 that determines whether or not the collision avoidance support is performed.

The driving support portion 11 includes a microcomputer having an arithmetic unit (CPU), and a nonvolatile or volatile storage device such as a ROM or a RAM. The nonvolatile storage device of the driving support portion 11 stores therein control programs for executing various processes, and various parameters used for the various processes. The arithmetic unit executes the control programs stored in the storage device as needed, and refers to the various parameters as needed at the time of executing the control programs. Note that, in the present embodiment, the control programs include a program to specify an object, a program to calculate relative information, a program to calculate a time-to-collision, and a program to determine whether or not the collision avoidance support is activated. Note that these programs may be stored in the driving support portion 11 as individual programs, so as to be executed independently. Further, the various parameters include various parameters used for specification of an object, calculation of relative information, calculation of a time-to-collision, and determination on whether or not the collision avoidance support is performed.

That is, in the driving support portion 11, by executing the control programs, a function of the object specifying portion 14, a function of the relative information calculation portion 20, a function of the time-to-collision calculation portion 30, and a function of the support management portion 50 are performed.

The object specifying portion 14 detects objects including objects, including the leading vehicle 60, present in the travelling direction of the vehicle 10, based on vehicle outside information input therein from the vehicle outside information acquisition portion 15. Then, the object specifying portion 14 specifies the leading vehicle 60 as a target to be avoided in the collision avoidance support, from among the objects thus detected.

The relative information calculation portion 20 calculates relative information between the vehicle 10 and the leading vehicle 60 present ahead of the vehicle 10 in the travelling direction. The relative information calculation portion 20 calculates an inter-vehicle distance L between the vehicle 10 and the leading vehicle 60 based on vehicle outside information input therein from the vehicle outside information acquisition portion 15, and outputs the inter-vehicle distance L thus calculated to the time-to-collision calculation portion 30 and the support management portion 50. Further, the relative information calculation portion 20 includes: a velocity calculation portion 21 that calculates a relative velocity Vr, which is relative information between the vehicle 10 and the leading vehicle 60; a braking time calculation portion 22 serving as a braking time acquisition portion that calculates a braking time Tb; and a lateral change amount calculation portion 23 serving as a lateral change detecting portion that calculates a relative lateral velocity Vy, which is a relative moving velocity. The relative information calculation portion 20 outputs the relative velocity Vr, the braking time Tb, and the relative lateral velocity Vy thus calculated, to the time-to-collision calculation portion 30 and the support management portion 50.

The velocity calculation portion 21 can acquire or calculate a relative velocity Vr based on vehicle outside information input therein from the vehicle outside information acquisition portion 15.

Figure 2:
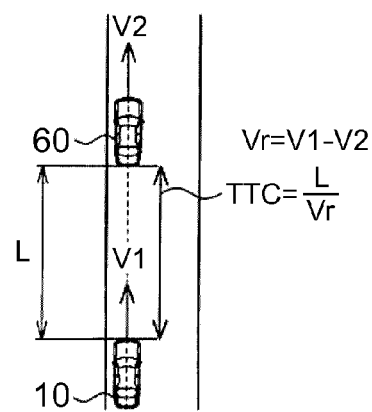
FIG. 2 is a schematic view schematically illustrating a relationship between a vehicle provided with the driving support device illustrated in FIG. 1 and a leading vehicle.

As illustrated in FIG. 2, the velocity calculation portion 21 may acquire a velocity V1 of the vehicle 10 from the vehicle information acquisition portion 18, and acquire a velocity V2 of the leading vehicle 60 from the vehicle outside information acquisition portion 15, so as to calculate a relative velocity Vr (=|V1−V2|) from a difference between the velocity V1 and the velocity V2 thus acquired.

The braking time calculation portion 22 calculates a braking time Tb corresponding to the relative velocity Vr between the vehicle 10 and the leading vehicle 60. The braking time Tb is a value that can be calculated based on a characteristic related to braking of the vehicle 10 and the relative velocity Vr, and is a lower limit of a time in which a general driver of the vehicle 10 can avoid collision between the vehicle 10 and the leading vehicle 60 by braking. The braking time Tb varies depending on the relative velocity Vr. Accordingly, in the distribution of sample data of a plurality of braking times obtained per relative velocity Vr, a short braking time is selected per relative velocity Vr. Note that the braking time Tb may be calculated by various calculations such as a calculation to calculate the braking time Tb in consideration of a relative acceleration or may be obtained based on experience, experimental data, simulation, and the like. Note that the braking time Tb may be selected from a table or a map determined in association with the relative velocity Vr, or may be calculated by applying the relative velocity Vr to a predetermined function.

The lateral change amount calculation portion 23 calculates a relative lateral velocity Vy between the vehicle 10 and the leading vehicle 60 (a lateral change detection step). The relative lateral velocity Vy is a relative velocity in a lateral direction perpendicular to the travelling direction of the vehicle 10. For example, when only the vehicle 10 changes (turns) the travelling direction, the relative lateral velocity Vy is obtained based on a lateral velocity component of a velocity of the vehicle 10.

Figure 3:
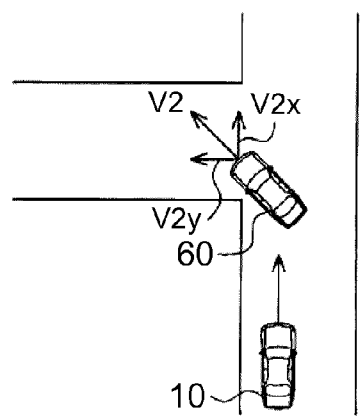
FIG. 3 is a plan view illustrating an example in which the driving support device illustrated in FIG. 1 detects a relative lateral velocity.

As illustrated in FIG. 3, when only the leading vehicle 60 changes the travelling direction, the relative lateral velocity Vy is obtained based on a lateral velocity component $V2y$ out of a velocity component $V2x$ in the travelling direction of the vehicle 10 and the lateral velocity component $V2y$, both constituting a velocity V2 of the leading vehicle 60.

Figure 4:
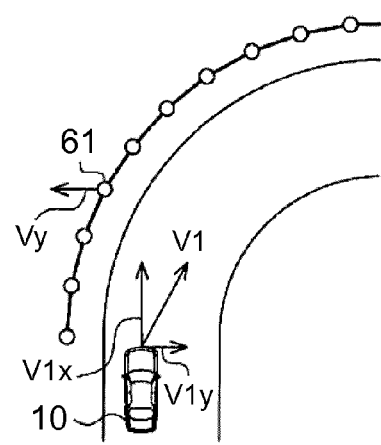
FIG. 4 is a plan view illustrating an example in which the driving support device illustrated in FIG. 1 detects a relative lateral velocity.

As illustrated in FIG. 4, when the vehicle 10 runs on a curve road, for example, the lateral change amount calculation portion 23 can also calculate the relative lateral velocity Vy between the vehicle 10 and a guardrail 61. When the vehicle 10 runs on the curve road, a velocity V1 of the vehicle 10 is constituted by a velocity component $V1x$ toward a vehicle front side and a velocity component $V1y$ toward a lateral direction perpendicular to the vehicle front side. That is, on the basis of the vehicle 10, the guardrail 61 as a stationary object moves in a reverse direction at the velocity component $V1y$ of the vehicle 10 in the lateral direction. That is, the relative lateral velocity Vy between the vehicle 10 and the guardrail 61 is obtained based on the velocity component $V1y$ of the vehicle 10 in the lateral direction.

As illustrated in FIG. 1, relative information between the vehicle 10 and the leading vehicle 60 is input into the time-to-collision calculation portion 30 from the relative information calculation portion 20. The time-to-collision calculation portion 30 includes a TTC calculation portion 31 that calculates a time-to-collision Ta, i.e., so-called TTC (Time To Collision). The time-to-collision Ta is a time that the vehicle 10 takes to collide with the leading vehicle 60. The time-to-collision calculation portion 30 outputs the time-to-collision (TTC) Ta thus calculated to the support management portion 50.

As illustrated in FIG. 2, the TTC calculation portion 31 calculates a time-to-collision Ta of the vehicle 10 with respect to the leading vehicle 60. The TTC calculation portion 31 obtains the inter-vehicle distance L and the relative velocity Vr between the vehicle 10 and the leading vehicle 60, from the relative information calculation portion 20. Then, the time-to-collision (TTC) Ta is calculated according to Formula (1) as follows.

$$TTC = L/Vr \quad (1)$$

Note that the calculation method of the time-to-collision (TTC) is not limited to Formula (1), and if an appropriate time-to-collision is obtained, other methods including a method in consideration of a relative acceleration may be used.

As illustrated in FIG. 1, the storage portion 40 stores therein a steering time T1, which is a time necessary to avoid collision by turning through steering, a suppression period 41, which is a period to restrain the collision avoidance support, and an activation threshold TH1 as a threshold used to determine whether or not the collision avoidance support is restrained.

Figure 5:
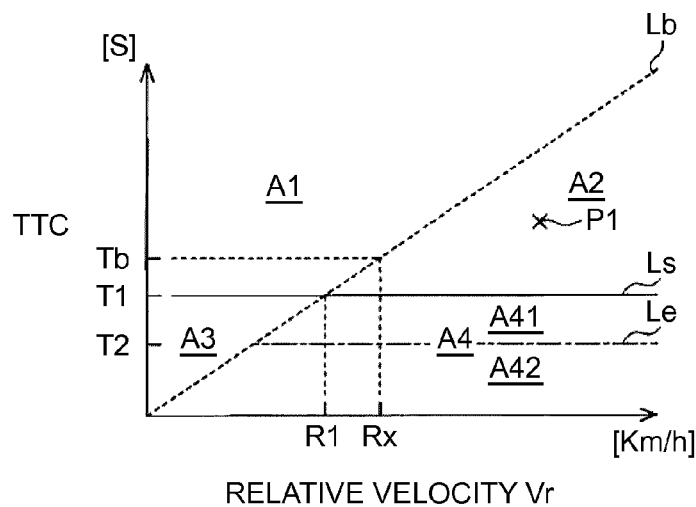
FIG. 5 is a graph illustrating a determination region constituted by a time-to-collision (TTC) and a relative velocity (Vr), the determination region being used in the driving support device illustrated in FIG. 1.

As illustrated in FIG. 5, the steering time T1 is a constant time regardless of a value of the relative velocity Vr, and is set to a lower limit of a time in which a general driver can avoid collision by steering, i.e., a time that attains avoidance by general steering.

Figure 6:
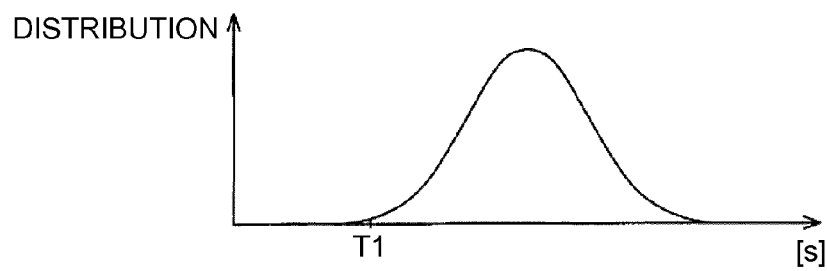
FIG. 6 is a graph illustrating a setting example of a time (T1) in which collision can be avoided by steering in the driving support device illustrated in FIG. 1.

As illustrated in FIG. 6, as the steering time T1, a short steering time is selected in the distribution of sample data of a plurality of steering times, but the steering time T1 may be a time calculated by various calculations, or a time obtained based on experience, experimental data, simulation, and the like.

The suppression period 41 is a period during which the activation of the collision avoidance support is restrained (temporarily stopped), and is set to a time such as an operation cycle of 1 to 10 times, for example. The suppression period 41 may be a period calculated by various calculations, or a period obtained based on experience, experimental data, simulation, and the like.

Figure 7:
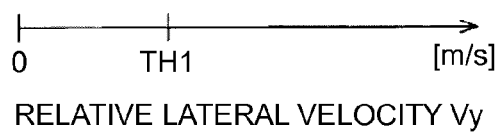
FIG. 7 is a graph illustrating an activation threshold (TH1) used to determine whether or not a driving support is activated in the driving support device illustrated in FIG. 1.

As illustrated in FIG. 7, the activation threshold TH1 is a threshold to be compared with the relative lateral velocity Vy at the time when it is determined whether or not the collision avoidance support is restrained. The activation threshold TH1 can be any threshold provided that it is possible to estimate that steering is performed to such an extent that collision between the vehicle 10 and the leading vehicle 60 can be restrained. The activation threshold TH1 may be a threshold calculated by various calculations, or a threshold obtained based on experience, experimental data, simulation, and the like. In the driving support portion 11, when the relative lateral velocity Vy is the activation threshold TH1 or more, it is determined that the collision avoidance support is restrained, but when the relative lateral velocity Vy is less than the activation threshold TH1, it is determined that the collision avoidance support is not restrained.

As illustrated in FIG. 1, the support management portion 50 determines whether or not the collision avoidance support is performed, based on the time-to-collision Ta and the relative velocity Vr (a support management step). The support management portion 50 includes: an estimation portion 51 that determines whether or not the collision avoidance support is activated; and an adjustment portion 52 that determines whether or not the activation of the collision avoidance support is restrained.

As illustrated in FIG. 5, in the estimation portion 51, a two-dimensional region in which the time-to-collision (TTC) is taken as a vertical axis and the relative velocity Vr is taken as a horizontal axis is prescribed as a determination region. In the determination region thus prescribed in the estimation portion 51, a region in which the collision avoidance support is activated, a region in which the collision avoidance support is not activated, and the like regions are further prescribed. In the determination region, a braking boundary line Lb is provided based on a braking time Tb determined according to the relative velocity Vr between the vehicle 10 and the leading vehicle 60. The braking boundary line Lb is a line expressed by Formula (2) as follows, and is shown as a line increasing toward an upper right side from an origin in the determination region. Note that α in Formula (2) described below is a value determined based on a braking characteristic of the vehicle. In the determination region, a steering boundary line Ls is provided based on a steering time T1 determined regardless of the relative velocity Vr between the vehicle 10 and the leading vehicle 60. The steering boundary line Ls is a line expressed by Formula (3) as follows, and in the determination region, the steering boundary line Ls is shown as a line in which the time-tocollision (TTC) takes a constant value, that is, a line perpendicular to the vertical axis.

$$TTC = \alpha \times Vr \quad (2)$$

$$TTC = T1 \quad (3)$$

Note that the calculation methods of the braking boundary line Lb and the steering boundary line Ls are not limited to Formula (2) and Formula (3) described above provided that an appropriate braking time and an appropriate steering time to each relative velocity Vr are shown. That is, the braking boundary line Lb and the steering boundary line Ls may be stored in the storage portion 40 in advance as data such as maps.

As illustrated in FIG. 5, when the relative velocity Vr is a velocity R1 on the braking boundary line Lb, the braking time Tb on the braking boundary line Lb and the steering time T1 on the steering boundary line Ls are the same time, so that the braking boundary line Lb intersects with the steering boundary line Ls. Accordingly, the determination region is sectioned into four regions by the braking boundary line Lb and the steering boundary line Ls. More specifically, the determination region is sectioned into a first region A1 where the time-to-collision (TTC) is not less than the braking boundary line Lb but not more than the steering boundary line Ls, and a second region A2 where the time-to-collision (TIC) is less than the braking boundary line Lb but not less than the steering boundary line Ls. Further, the determination region is sectioned into a third region A3 where the time-to-collision (TTC) is not less than the braking boundary line Lb but less than the steering boundary line Ls, and a fourth region A4 where the time-to-collision (TTC) is less than the braking boundary line Lb and less than the steering boundary line Ls.

The first region A1 is a region where collision of the vehicle 10 with the leading vehicle 60 is avoidable by braking or steering, and a region where the collision avoidance support is unnecessary.

The second region A2 is a region where collision of the vehicle 10 with the leading vehicle 60 is difficult to be avoided by braking, but is avoidable by steering, and is a region that requires the collision avoidance support in a case where at least a steering operation is not performed.

The third region A3 is a region where collision of the vehicle 10 with the leading vehicle 60 is avoidable by braking, but is difficult to be avoided by steering, and is a region where the collision avoidance support may not be performed because the relative velocity is small or the collision is avoidable by braking.

The fourth region A4 is a region where collision of the vehicle 10 with the leading vehicle 60 is difficult to be avoided by braking and steering, and a region where the collision avoidance support is necessary. The fourth region A4 is further sectioned by a caution line Le indicative of a caution time T2, which is shorter than the steering time T1. In a region where the time-to-collision (TTC) is not less than the caution line Le, a low support region A41 where a weak collision avoidance support is performed is formed. Further, in a region where the time-to-collision (TTC) is less than the caution line Le, a high support region A42 where a strong collision avoidance support is performed is formed. When a relationship between the time-to-collision Ta and the relative velocity Vr falls within the low support region A41 or the high support region A42, the driving support portion 11 performs the collision avoidance support to the vehicle 10 without being restrained. For example, in the low support region A41, a warning is notified through the HMI 12, or an assist brake control to increase a brake power is performed. In the high support region A42, a warning is notified through the HMI 12, and a deceleration control, a steering control, or the like is performed through the intervention control device 13.

Figure 8:
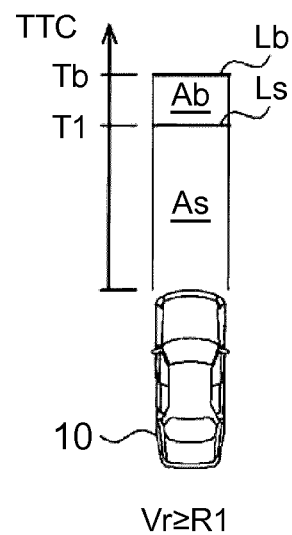
FIG. 8 is a relationship diagram illustrating the graph illustrated in FIG. 5 and a relationship between a vehicle and a region ahead of the vehicle in its travelling direction.

FIG. 8 illustrates a position corresponding to the braking time Tb and a position corresponding to the steering time T1, both set ahead of the vehicle 10 in the travelling direction, at the time when the relative velocity Vr is not less than the velocity R1.

As illustrated in FIG. 8, when the relative velocity Vr is not less than the velocity R1, first, the steering time T1, that is, a position corresponding to the steering boundary line Ls is set ahead of the vehicle 10 in the travelling direction, and an area As where collision avoidance by steering is difficult is set between the vehicle 10 and the steering boundary line Ls. Further, the braking time Tb, that is, a position corresponding to the braking boundary line Lb is set on a front side relative to the position corresponding to the steering boundary line Ls, ahead of the vehicle 10 in the travelling direction thereof, and an area Ab where collision avoidance by braking is difficult is set between the vehicle 10 and the braking boundary line Lb. Thus, when the relative velocity Vr is not less than the velocity R1, the area As corresponds to the fourth region A4, and the area Ab corresponds to the second region A2.

Figure 9:
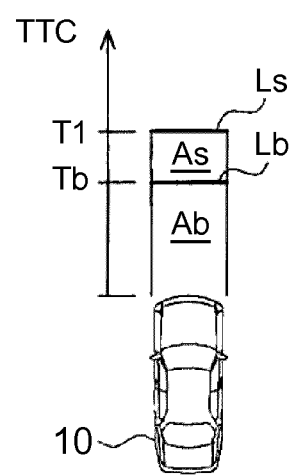
FIG. 9 is a relationship diagram illustrating the graph illustrated in FIG. 5 and a relationship between the vehicle and the region ahead of the vehicle in its travelling direction.
Figure 10:
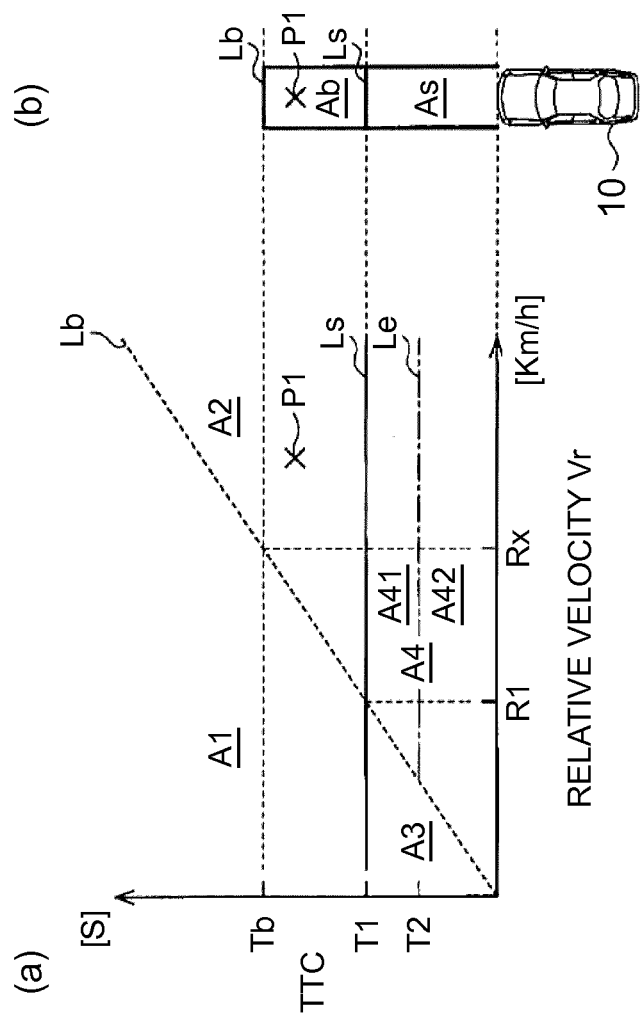
FIG. 10 is a view illustrating a relationship between the determination region and the region ahead of the vehicle in its travelling direction in the graph illustrated in FIG. 5.

FIG. 9 illustrates a position corresponding to the braking time Tb and a position corresponding to the steering time T1, both set ahead of the vehicle 10 in the travelling direction, at the time when the relative velocity Vr is less than the velocity R1.

As illustrated in FIG. 9, when the relative velocity Vr is less than the velocity R1, first, the braking time Tb, that is, a position corresponding to the braking boundary line Lb is set ahead of the vehicle 10 in the travelling direction, and an area Ab where collision avoidance by braking is difficult is set between the vehicle 10 and the braking boundary line Lb. Further, the steering time T1, that is, a position corresponding to the steering boundary line Ls is set on a front side relative to the position corresponding to the braking boundary line Lb, ahead of the vehicle 10 in the travelling direction, and an area As where collision avoidance by steering is difficult is set between the vehicle 10 and the steering boundary line Ls. Thus, when the relative velocity Vr is less than the velocity R1, the area Ab corresponds to the fourth region A4, and the area As corresponds to the third region A3.

The estimation portion 51 specifies a determination position P1 in the determination region based on a current time-to-collision Ta and a current relative velocity Vr. When the determination position P1 is in the first region A1 or in the third region A3, the estimation portion 51 determines that "the collision avoidance support is not activated." Further, when the determination position P1 is in the fourth region A4, the estimation portion 51 determines that "the collision avoidance support is activated." At this time, when the determination position P1 is in the low support region A41, the estimation portion 51 determines that a weak collision avoidance support is performed, and when the determination position P1 is in the high support region A42, the estimation portion 51 determines that a strong collision avoidance support is performed. In the meantime, when the determination position P1 is in the second region A2, estimation portion 51 determines that "a condition to activate the collision avoidance support is established," and also determines that the determination position P1 is in the second region A2. Then, the estimation portion 51 outputs a determination result to the adjustment portion 52.

When the determination result input from the estimation portion 51 is that "the collision avoidance support is not activated," the adjustment portion 52 does not perform the collision avoidance support. In other words, since the necessity of the collision avoidance support is determined appropriately, when a possibility of collision (a threat of collision) is low, the collision avoidance support is not performed.

When the determination result input from the estimation portion 51 is that "the collision avoidance support is activated," the adjustment portion 52 performs the collision avoidance support. That is, the adjustment portion 52 outputs a warning instruction signal to the HMI 12 as needed, and outputs an intervention control signal to the intervention control device 13. In other words, since the necessity of the collision avoidance support is determined appropriately, when the possibility of collision is high, the collision avoidance support is performed.

When the determination result input from the estimation portion 51 is that "a condition to activate the collision avoidance support is established," the adjustment portion 52 determines whether or not the collision avoidance support is restrained, based on a comparison of the relative lateral velocity Vy between the vehicle 10 and the leading vehicle 60 with the activation threshold TH1 (see FIG. 7).

When the relative lateral velocity Vy is less than the activation threshold TH1, the possibility of collision is high, so that the adjustment portion 52 determines that the collision avoidance support is not restrained, and activates the collision avoidance support. At this time, the adjustment portion 52 performs a weak collision avoidance support. That is, the adjustment portion 52 outputs a warning instruction signal to the HMI 12 as needed, and outputs an intervention control signal to the intervention control device 13. In other words, the necessity of the collision avoidance support is determined appropriately, and when the possibility of collision is high, the collision avoidance support is performed.

In the meantime, when the relative lateral velocity Vy is not less than the activation threshold TH1, the possibility of collision is temporarily lowered, so that the adjustment portion 52 determines that the collision avoidance support is restrained. Then, regardless of the determination result of the estimation portion 51, the adjustment portion 52 does not activate the collision avoidance support for a period that is set as the suppression period 41. That is, the activation of the collision avoidance support is restrained, the warning instruction signal is not output to the HMI 12, and the intervention control signal is not output to the intervention control device 13. In other words, the necessity of the collision avoidance support is determined appropriately, and when the possibility of collision is low, the collision avoidance support is not performed.

Thus, by using the relative lateral velocity Vy for determination on whether or not the activation of the collision avoidance support is restrained, even if steering is not performed in the vehicle 10, the necessity of the collision avoidance support is determined appropriately. For example, as illustrated in FIG. 3, the adjustment portion 52 can determine whether or not it is necessary to restrain the collision avoidance support, based on the relative lateral velocity Vy obtained from the lateral velocity component V2y caused by the leading vehicle 60 turning by steering. Further, even if steering is performed in the vehicle 10 as illustrated in FIG. 4, the vehicle 10 is highly likely to approach the guardrail 61, and the time-to-collision (TTC) may be easily shortened. At this time, the adjustment portion 52 determines whether a possibility of collision with the guardrail 61 is high or low, based on the relative lateral velocity Vy between the vehicle 10 and the guardrail 61, and determines whether or not it is necessary to restrain the collision avoidance support.

Next will be more specifically described an operation of the driving support portion 11 in a case where the determination position P1 is in the second region A2 of the determination region.

As illustrated in FIG. 10(a), when the determination position P1 is in the second region A2 of the determination region, it is difficult for the vehicle 10 to avoid collision with the leading vehicle 60 by braking, but the vehicle 10 can avoid the collision by steering. Accordingly, in a case where the steering operation is not performed, the vehicle 10 in which the determination position P1 is in the second region A2 is highly likely to collide with the leading vehicle 60, but in a case where the steering operation is performed, the vehicle 10 is unlikely to collide with the leading vehicle 60. Thus, even if the determination position P1 is in the second region A2, the possibility of collision with the leading vehicle 60 may become high or low depending on an operation state of the vehicle 10.

That is, in a case where the determination position P1 is in the second region A2, when a necessary amount of the steering operation to avoid the collision is not performed, the vehicle 10 is very likely to collide with the leading vehicle 60. Accordingly, it is appropriate that the driving support portion 11 activates the collision avoidance support. Such an appropriate driving support can yield effects of avoidance of the collision and reduction in damage, and is unlikely to give an uncomfortable feeling to the driver.

In the meantime, in a case where the determination position P1 is in the second region A2, when a necessary amount of the steering operation to avoid the collision is performed, the vehicle 10 is unlikely to collide with the leading vehicle 60. Accordingly, it may not be appropriate that the driving support portion 11 activates the collision avoidance support. Such an inappropriate collision avoidance support may cause the driver to feel troublesome, or may give uncomfortable feeling to the driver.

Accordingly, in a case where the determination position P1 is in the second region A2, it is necessary to determine whether a driving operation performed in the vehicle 10 is steering or not. In a case where steering is performed in the vehicle 10, it is possible to determine whether or not a steering amount is an amount required by collision avoidance, based on vehicle information and the like obtained from the steering sensor 186.

In the meantime, if the leading vehicle 60 turns by steering, the same effect as a case where the vehicle 10 turns is obtained. That is, collision between the vehicle 10 and the leading vehicle 60 is avoided even in a case where the leading vehicle 60 moves away from the lane or the road where the vehicle 10 travels. That is, it is desirable to be able to determine appropriately whether or not the turning of the leading vehicle 60 is turning necessary to avoid the collision.

In view of this, in the present embodiment, it is determined whether or not turning that can avoid the collision between the vehicle 10 and the leading vehicle 60 is performed, by use of the relative lateral velocity Vy between the vehicle 10 and the leading vehicle 60. Hereby, regardless of whether the vehicle 10 turns or the leading vehicle 60 turns, that is, regardless of whether the vehicle 10 performs steering or the leading vehicle 60 performs steering, it is determined appropriately whether or not the turning to avoid the collision between the vehicle 10 and the leading vehicle 60 is performed.

If the relative lateral velocity Vy is small, it is estimated that the leading vehicle 60 does not leave the travelling direction (a course) of the vehicle 10, and if the relative lateral velocity Vy is large, it is estimated that the leading vehicle 60 leaves the travelling direction (the course) of the vehicle 10. That is, if the leading vehicle 60 leaves the travelling direction of the vehicle 10, the possibility of collision is low, but if the leading vehicle 60 does not leave the travelling direction of vehicle 10, the possibility of collision is high.

Further, that relative lateral velocity Vy between the vehicle 10 and the leading vehicle 60 running on the same road which is affected by a shape of the road falls within a predetermined range, but in a case where lanes are changed, the relative lateral velocity Vy tends to be large. In view of this, the activation threshold TH1 can be set to be able to distinguish the change due to the shape of the road such as a curve, from the change due to lane changing, appropriately.

Accordingly, the driving support portion 11 can manage the necessity of the collision avoidance support more appropriately, and restrain unnecessary activation of the driving support effectively.

As described above, according to the driving support device of the present embodiment, it is possible to obtain the following effects.

(1) It is determined, based on the relative lateral velocity Vy of the leading vehicle 60, whether or not the activation of the collision avoidance support is restrained. In a case of the collision avoidance support, if a relative position of the leading vehicle 60 to the vehicle 10 laterally leaves the travelling direction of the vehicle, the possibility of collision between the vehicle 10 and the leading vehicle 60 is low, so that the necessity to activate the collision avoidance support is low. In view of this, the relative lateral velocity Vy of the leading vehicle 60 is compared with the activation threshold TH1, and when the relative lateral velocity Vy of the leading vehicle 60 is larger than the activation threshold TH1 and the possibility of collision is low, the activation of the collision avoidance support is restrained. Hereby, in a case where a driver considers that the support is unnecessary, e.g., in a case where the driver performs an avoidance operation by steering or the leading vehicle 60 changes lanes, the activation of the collision avoidance support is restrained, thereby reducing such a possibility that the driver feels troublesome.

(2) When the relative lateral velocity Vy is used for determination on whether or not the activation of the collision avoidance support is restrained as such, even if lateral positions of the leading vehicle 60 and the vehicle 10, both running on the same road, deviate from each other due to a curve or the like, the relative lateral velocity Vy is small, but when the lateral positions of the leading vehicle 60 and the vehicle 10 deviate from each other due to lane changing, the relative lateral velocity Vy is large. Accordingly, it is possible to distinguish the lane changing from the curve or the like, appropriately.

(3) A time-dependent change amount between the vehicle 10 and the leading vehicle 60 is detected based on the relative lateral velocity Vy. If the relative lateral velocity Vy of the leading vehicle 60 is small, it is estimated that the leading vehicle 60 does not leave the travelling direction of the vehicle 10, but if the relative lateral velocity Vy is large, it is estimated that the leading vehicle 60 leaves the travelling direction of the vehicle 10. That relative lateral velocity Vy between the vehicle 10 and the leading vehicle 60 running on the same road which is affected by a shape of the road falls within a predetermined range, so it is possible to distinguish the change due to the shape of the road such as a curve, from the change due to lane changing, appropriately.

(4) Even in a case where the time-to-collision Ta is not more than the braking time Tb and the collision avoidance is difficult by normal braking, if the driver performs an avoidance operation by steering or if the leading vehicle changes lanes, the activation of the collision avoidance support can be restrained. Hereby, that activation of the driving support which causes the driver to feel troublesome is reduced.

(5) Since the braking time Tb that is largely affected by the relative velocity Vr is obtained based on the relative velocity Vr between the vehicle 10 and the leading vehicle 60, an appropriate braking time Tb can be obtained.

Second Embodiment

The second embodiment that embodies a driving support device and a driving support method is described with reference to FIGS. 11 to 15.

The present embodiment is different from the first embodiment in that a target region as a region obtained in consideration of a turning characteristic of a vehicle is used for determination on whether or not activation of a collision avoidance support is restrained, but the other configurations are the same as in the first embodiment. In view of this, the following describes a configuration different from the first embodiment, and for purposes of this description, the same configuration has the same reference sign as in the first embodiment, and its detailed description is omitted.

Figure 11:
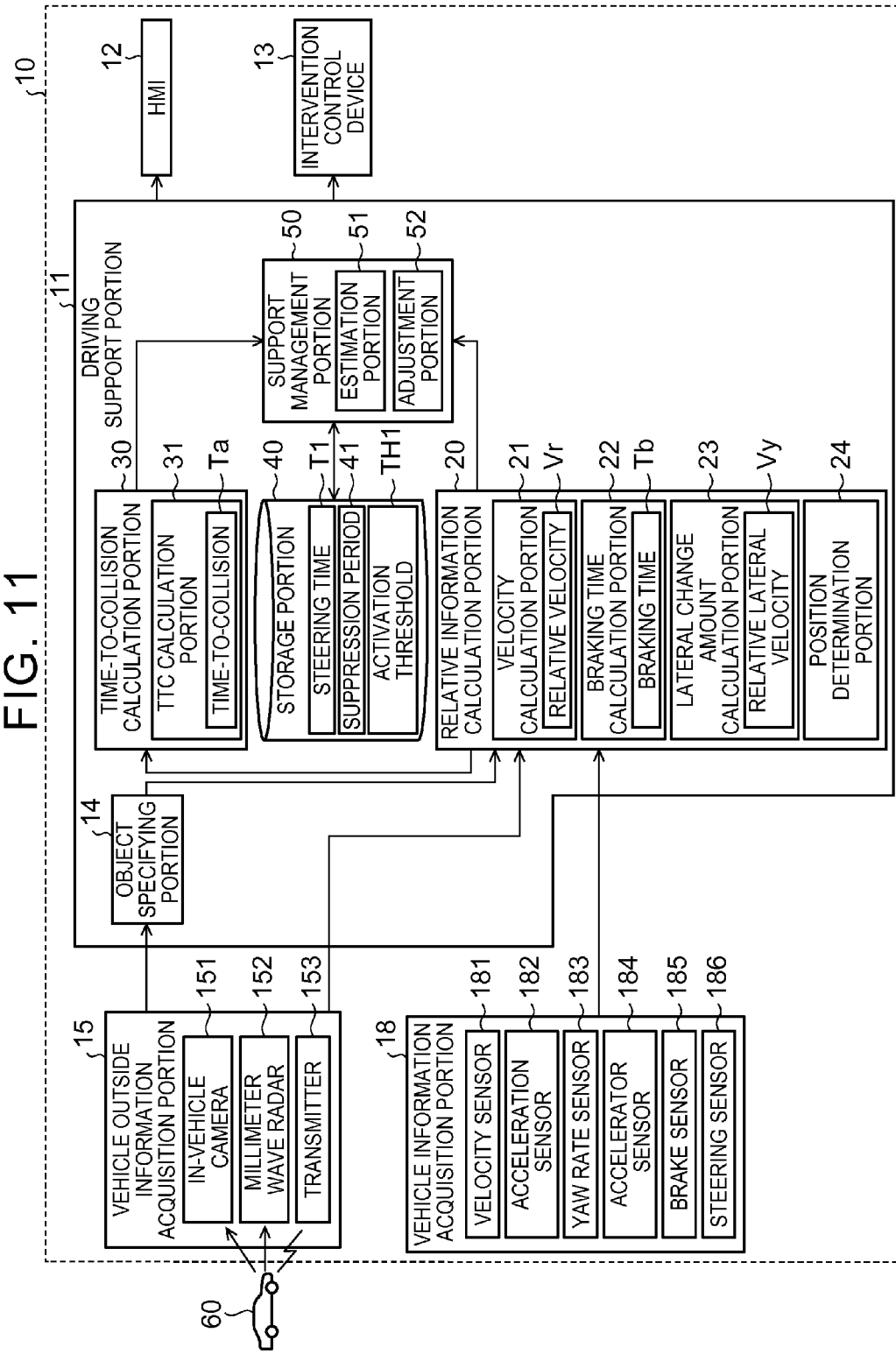
FIG. 11 is a block diagram illustrating a schematic configuration of a second embodiment that embodies a driving support device.
Figure 12:
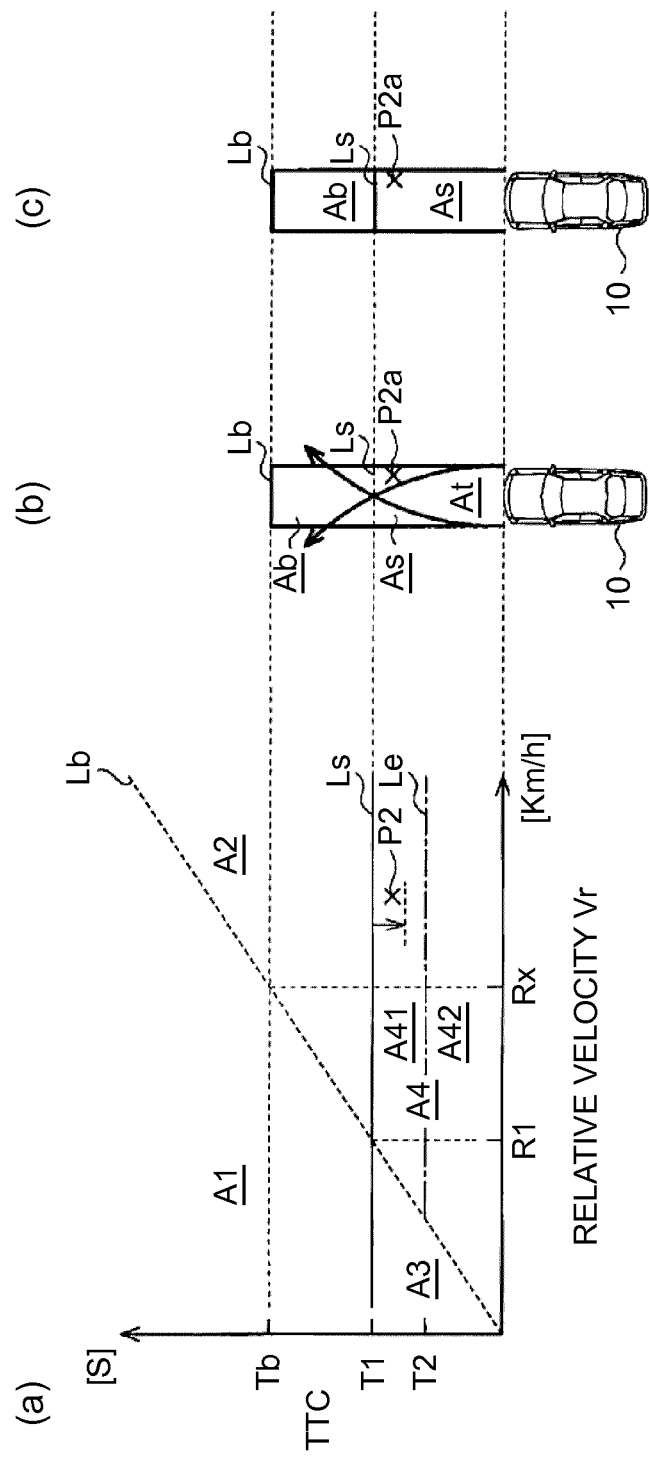
FIG. 12 is a view illustrating a relationship between a determination region and a region ahead of a vehicle in a travelling direction, in the driving support device in FIG. 11.

As illustrated in FIG. 11, a relative information calculation portion 20 includes a position determination portion 24 that determines a lateral position in a width direction of a vehicle 10 in regard to a leading vehicle 60 as an object present ahead of the vehicle 10 in a travelling direction. The relative information calculation portion 20 outputs the lateral position of the leading vehicle 60 thus calculated in the position determination portion 24, to a support management portion 50.

The position determination portion 24 determines a lateral position of the leading vehicle 60 specified by an object specifying portion 14. The lateral position of the leading vehicle 60 in the width direction of the vehicle 10 is determined based on vehicle outside information about the leading vehicle 60 input from a vehicle outside information acquisition portion 15.

As illustrated in FIGS. 12(b), 12(c), the position determination portion 24 detects that a position P2a corresponding to a left rear end of the leading vehicle 60 is present ahead of a right side of the vehicle 10, for example. The position P2a is a position set in a region ahead of the vehicle 10 in consideration of an overlapping position between the vehicle 10 and the leading vehicle 60, and corresponds to a determination position P2 on s determination region.

With reference to FIGS. 13, 14, the following describes a target region At illustrated in FIG. 12(b). The target region At is a region sectioned ahead of the vehicle 10 in the travelling direction in consideration of a turning characteristic of the vehicle 10. FIG. 13 describes a case of Vr≥R1, and FIG. 14 describes a case of Vr<R1.

As illustrated in FIG. 13, when the vehicle 10 turns to the left, a right tip end of the vehicle 10 draws a movement locus that gradually changes toward the left side like a left turning locus line LLt, as the vehicle 10 travels. On the other hand, when the vehicle 10 turns to the right, a left tip end of the vehicle 10 draws a movement locus that gradually changes toward the right side like a right turning locus line LRt, as the vehicle 10 travels. Then, the target region At is set in a range sectioned by the left turning locus line LLt, the right turning locus line LRt, and a front part of the vehicle 10.

As illustrated in FIG. 14, when an intersection between the right turning locus line LRt and the left turning locus line LLt exceeds a braking boundary line Lb, the target region At may be set in a region sectioned by the right turning locus line LRt, the left turning locus line LLt, the braking boundary line Lb, and the front part of the vehicle 10.

If the position P2a is included in the target region At, the support management portion 50 does not restrain the activation of the collision avoidance support, but if the position P2a is not included in the target region At, the support management portion 50 determines whether or not the activation of the collision avoidance support is restrained.

More specifically, the support management portion 50 estimates a time-to-collision obtained according to an entering position as a position at which the position P2a enters the target region At. The time-to-collision thus estimated is assumed a boundary between a second region A2 and a fourth region A4, which is equivalent to that a steering boundary line Ls is moved to (replaced with) the time-to-collision thus estimated. More specifically, in a case where a forward position relative to a width direction center of the vehicle 10 is the entering position, for example, the entering position corresponds to the steering boundary line Ls, so the support management portion 50 estimates a time-to-collision Ta. Further, in a case where the entering position is a right end position or a left end position of the vehicle 10, for example, the support management portion 50 estimates a minimum time-to-collision "0." Further, in a case where the position P2a from the width direction center of the vehicle 10 to the right end or the left end of the vehicle 10 is the entering position, the support management portion 50 estimates a time not more than the time-to-collision Ta but not less than the minimum time-to-collision, that is, the support management portion 50 sets the time thus estimated as a boundary between the second region A2 and the fourth region A4.

The support management portion 50 includes: an estimation portion 51 that determines whether or not the collision avoidance support is activated; and an adjustment portion 52 that determines whether or not the activation of the collision avoidance support is restrained.

In the case of FIGS. 12(a), 12(b), when the steering boundary line Ls in the determination region is replaced with the time-to-collision thus estimated, the estimation portion 51 determines that "the collision avoidance support is activated," with the proviso that the determination position P2 is in the fourth region A4, that is, with the proviso that the position P2a is included in the target region At. In the meantime, when the steering boundary line Ls in the determination region is replaced with the time-to-collision thus estimated, the estimation portion 51 determines that "a condition to activate the collision avoidance support is established," with the proviso that the determination position P2 is in the second region A2, that is, with the proviso that the position P2a is not included in the target region At. Then, the estimation portion 51 outputs a determination result to the adjustment portion 52.

When the determination result input from the estimation portion 51 is that "a condition to activate the collision avoidance support is established," the adjustment portion 52 determines whether or not the collision avoidance support is restrained, based on a comparison of a relative lateral velocity Vy between the vehicle 10 and the leading vehicle 60, with an activation threshold TH1. Hereby, the necessity of the collision avoidance support is determined appropriately, and when a possibility of collision is high, the collision avoidance support is activated, and when the possibility of collision is low, the collision avoidance support is not activated.

In the present embodiment, the steering boundary line Ls is replaced with the estimated time-to-collision, and if the position P2a of the object is out of the target region At, it is possible to determine that the possibility of collision is low. Hereby, a case where the possibility of collision is low is determined more appropriately, and when the possibility of collision is low, the collision avoidance support is not performed.

As described above, according to the driving support device of the present embodiment, it is possible to obtain the following effect in addition to the effects (1) to (5) described in the first embodiment.

(6) In consideration of the turning characteristic of the vehicle 10, the steering time T1 (steering boundary line Ls) to be compared with the time-to-collision Ta is replaced with the time to be obtained according to the entering position, which is the position at which the object enters the target region At. The time to be replaced is the steering time T1 in a case where the entering position is a vehicle width center of the vehicle 10, and when the entering position is away from the vehicle width center, the time to be replaced becomes shorter than the steering time T1. This allows activation of a driving support related to collision avoidance to be delayed appropriately. Since the vehicle 10 has a width, in consideration of the turning characteristic of the vehicle 10, the collision avoidance from the object can be performed even in a state where the vehicle 10 is closer thereto, at the time when the object is at a position that is away from the vehicle width center, as compared with a case where the object is at the vehicle width center. Accordingly, the activation of the driving support of the vehicle 10 with respect to an object at a position that is away from the vehicle width center can be restrained based on the relative lateral velocity Vy even in such a state where the vehicle 10 is closer to the object, as compared with the object at the vehicle width center. Hereby, that activation of the driving support which causes a driver to feel troublesome can be restrained still more.

Third Embodiment

The third embodiment that embodies a driving support device and a driving support method is described with reference to FIGS. 15, 16.

The present embodiment is different from the first embodiment in that an activation threshold and a level threshold are used, but the other configurations are the same as the first embodiment. In view of this, the following describes a configuration different from the first embodiment, and for purposes of this description, the same configuration has the same reference sign as in the first embodiment, and its detailed description is omitted.

As illustrated in FIG. 15, an activation threshold TH1, and a level threshold TH2, which is a value larger than the activation threshold TH1, are set in a storage portion 40. Further, a period (a short period) that is short as a period corresponding to the activation threshold TH1, and a period (a long period) that is longer than the short period as a period corresponding to the level threshold TH2 are set in a suppression period 41. If the short period is set as a time shorter than the long period, a reference (a unit) used to set the period may be a time or the like other than an operation cycle.

When the relative lateral velocity Vy is not less than the activation threshold TH1 but less than the level threshold TH2, a possibility of collision is temporarily lowered, so that an adjustment portion 52 restrains a collision avoidance support for the short period set in the suppression period 41. Further, when the relative lateral velocity Vy is not less than the level threshold T2, the possibility of collision is lowered for a while, so that the adjustment portion 52 restrains the collision avoidance support for the long period set in the suppression period 41.

That is, the adjustment portion 52 selects an appropriate suppression period from the suppression period 41 according to a level of the possibility of collision estimated from the relative lateral velocity Vy. Then, regardless of a determination result of an estimation portion 51, the adjustment portion 52 does not activate the collision avoidance support for the suppression period thus selected. In other words, the necessity of the collision avoidance support is determined appropriately based on the level of the possibility of collision, and when the possibility of collision is low, the collision avoidance support is not activated.

When the adjustment portion 52 restrains the activation of the collision avoidance support for the long period, an influence due to an abnormal value temporarily caused in the relative lateral velocity Vy can be reduced.

As illustrated in FIG. 16, even if it is determined that the possibility of collision is low for a while, it is difficult to avoid the relative lateral velocity Vy varying per operation cycle. For example, like 0.1 m/s shown in the fifth operation cycle, if a relative lateral velocity Vy with a low possibility of collision avoidance is detected, the collision avoidance support might be activated based on the relative lateral velocity Vy. In the present embodiment, when it is determined that the possibility of collision is low for a while, the activation of the collision avoidance support is restrained regardless of a value of the relative lateral velocity Vy calculated per operation cycle, for the long period selected from the suppression period 41. Hereby, the influence that abnormality temporarily caused in the relative lateral velocity Vy gives to the collision avoidance support is reduced. Hereby, unnecessary activation of the collision avoidance support is restrained effectively.

As described above, according to the driving support device of the present embodiment, it is possible to obtain the following effects in addition to the effects (1) to (5) described in the first embodiment.

(7) The suppression period 41, which is a period to restrain the activation of the collision avoidance support, is adjusted (selected) based on the relative lateral velocity Vy. That is, based on the relative lateral velocity Vy, an appropriate suppression period 41 is selected.

(8) If the relative lateral velocity Vy is large, an object is highly likely to leave a course of the vehicle 10, so that the possibility of collision of the vehicle 10 with the object is low. Accordingly, when a possibility of leaving the course is high, that is, when the possibility of collision is low, the suppression period 41 is extended, thereby making it possible to reduce a possibility of that activation of the collision avoidance support which causes a driver to feel troublesome.

Fourth Embodiment

The fourth embodiment that embodies a driving support device and a driving support method is described with reference to FIG. 17.

The present embodiment describes a function to correct a relative lateral velocity which function can be included in the configuration of the first embodiment, so the other configurations except a configuration related to the function are the same as in the first embodiment. In view of this, the following describes a configuration different from the first embodiment, and for purposes of this description, the same configuration has the same reference sign as in the first embodiment, and its detailed description is omitted.

Generally, vehicle outside information input from a vehicle outside information acquisition portion 15 requires a long time to detect information about an object. In the meantime, in regard to vehicle information input from a vehicle information acquisition portion 18, information detection about a vehicle 10 can be performed in a short time, e.g., in a time of not more than one-fifth to one-tenth of the long time. On this account, when steering is detected in the vehicle 10, a relative lateral velocity Vy of the object is calculated by a lateral change amount calculation portion 23 by reflecting steering information of the vehicle 10 thus detected. Hereby, response of the relative lateral velocity Vy of the object can be increased.

As illustrated in FIG. 17, in the present embodiment, when a lateral velocity component V1y is caused in the vehicle 10, a lateral change amount calculation portion 23 performs correction such that the relative lateral velocity Vy of the object includes the lateral velocity component V1y of the vehicle 10.

In a case where a yawing rate increases from FIGS. 17(a) to 17(b), the lateral change amount calculation portion 23 cannot immediately acquire an increase in the relative lateral velocity of the object from the vehicle outside information input from the vehicle outside information acquisition portion 15. One of the reasons is because it takes a long time for the vehicle outside information acquisition portion 15 to detect the object.

In view of this, when the yawing rate of the vehicle 10 changes, the lateral change amount calculation portion 23 calculates the relative lateral velocity Vy by adding a lateral velocity component obtained from the yawing rate of the vehicle 10.

Hereby, the relative lateral velocity Vy of the object can be obtained as a large value, so that the necessity of a collision avoidance support is managed more appropriately, so as to effectively restrain unnecessary activation of the collision avoidance support.

As described above, according to the driving support device of the present embodiment, it is possible to obtain the following effect in addition to the effects (1) to (5) described in the first embodiment.

(9) The relative lateral velocity Vy of the object is corrected based on that travelling direction (orientation) of the vehicle which is changed by a steering operation (steering) or the like. By correcting the relative lateral velocity Vy of the object by the change of the travelling direction of the vehicle 10, response for the detection of the relative lateral velocity Vy can be improved. For example, in comparison with a sensor that measures a vehicle state, that relative time-dependent change amount of the object which is detected based on a radar or the like with a low response naturally has a low response. In view of this, by using a measurement result of a sensor having a high response and measuring a vehicle state such as a yaw rate, it is possible to achieve a high response of the relative lateral velocity Vy.

Other Embodiment

Note that each of the above embodiments can be performed in the following embodiment.

The above embodiments exemplify different configurations. Alternatively, any two or more of the configurations of the first to fourth embodiments may be combined. This improves a design flexibility of the driving support device, thereby making it possible to more appropriately restrain the activation of the collision avoidance support.

The above embodiments exemplify a case where the vehicle outside information acquisition portion 15 is constituted by the in-vehicle camera 151, the millimeter wave radar 152, and the transmitter 153. Alternatively, the vehicle outside information acquisition portion may be constituted by at least one of the in-vehicle camera, the millimeter wave radar, and the transmitter. Further, the vehicle outside information acquisition portion may be various sensors that can acquire a relative distance to an object and a relative lateral position, and the vehicle outside information acquisition portion is more preferably a sensor that can directly acquire a relative velocity, a relative acceleration, and a relative lateral velocity.

The above embodiments exemplify a case where the vehicle information acquisition portion 18 is constituted by the velocity sensor 181, the acceleration sensor 182, the yaw rate sensor 183, the accelerator sensor 184, the brake sensor 185, and the steering sensor 186. Alternatively, the vehicle information acquisition portion may be constituted by at least two of the velocity sensor, the acceleration sensor, the yaw rate sensor, the accelerator sensor, the brake sensor, and the steering sensor.

The above embodiments exemplify a case where the relative lateral velocity Vy is a relative time-dependent change amount used for determination on whether or not the activation of the collision avoidance support is restrained. Alternatively, as the relative time-dependent change amount used for determination on whether or not the activation of the collision avoidance support is restrained, a relative lateral acceleration may be used.

The above embodiments exemplify a case where a threshold such as the activation threshold TH1 or the level threshold TH2 to be compared with the relative lateral velocity is the same regardless of the type of the object. Alternatively, the threshold to be compared with the relative lateral velocity may be changed according to the type of the object.

As illustrated in FIG. 18, for example, the threshold to be compared with the relative lateral velocity may be set according to the type of the object, such that the threshold is set to Ti1 for a leading vehicle, Ti2 for an oncoming vehicle, and Ti3 for a stationary object.

Further, the threshold to be compared with the relative lateral velocity may not be changed according to the type of the object, and the suppression period may be changed instead of that.

Further, the threshold to be compared with the relative lateral velocity may be changed according to the type of the object, and the suppression period may be changed according to the type of the object.

This improves the design flexibility of the driving support device.

The above embodiments exemplify a case where a threshold such as the activation threshold TH1 or the level threshold TH2 to be compared with the relative lateral velocity is the same regardless of a distance to the object. Alternatively, the threshold to be compared with the relative lateral velocity may be changed according to the distance to the object. That is, it is preferable to set a threshold in consideration of a characteristic of the relative lateral velocity that is detected to be large according to a length of the inter-vehicle distance between the vehicle and the leading vehicle.

As illustrated in FIG. 19, for example, the threshold to be compared with the relative lateral velocity according to the distance to the object may be set to Td1 for a short distance, Td2 for a medium distance, and Td3 for a long distance. At this time, the threshold may be set so as to satisfy a relationship of Td1<Td2<Td3. This improves the design flexibility of the driving support device.

The above embodiments exemplify a case where the collision avoidance support is restrained for the suppression period 41. Alternatively, the suppression period may be extended infinitely, so that the activation of the collision avoidance support may be restrained to the maximum, that is, may be inhibited. In this case, with the proviso that the object for the collision avoidance support is changed, it can be determined again whether or not the collision avoidance support is restrained. This improves the design flexibility of the driving support device.

The above embodiments exemplify a case where a suppression time, the activation threshold TH1, and the level threshold TH2 are changed according to the type of the object or the distance to the object. Alternatively, the suppression time, the activation threshold, and the level threshold may be changed according to a surrounding environment around the vehicle, such as a road shape and weather. This improves a design flexibility of a driving support.

The above embodiments exemplify a case where the relative lateral velocity Vy is compared with one or two thresholds (the activation threshold TH1 and the level threshold TH2). Alternatively, three or more thresholds to be compare with the relative lateral velocity may be used. For example, in a case where three or more thresholds are used, a length of the suppression period can be set separately for a magnitude of each threshold. This improves the design flexibility of the driving support device.

The above embodiments exemplify a case where, when the determination position P1 is in the second region A2, it is determined whether or not the collision avoidance support is activated. Alternatively, when the determination position is in the first and second regions, that is, when the determination position is on the steering boundary line or above, it is determined whether or not the collision avoidance support is activated. At this time, only when the velocity of the vehicle is high, the determination on whether or not the collision avoidance support is activated may be performed with the proviso that the determination position is in the first and second regions. For example, in a case where the velocity of the vehicle is fast, a relative velocity between the vehicle and the leading vehicle is small, and if the inter-vehicle distance is extremely short even though the time-to-collision is long, the occurrence of the collision avoidance support does not cause the driver to feel troublesome.

This can improve a possibility of application of the driving support device.

The above embodiments exemplify a case where the driving support portion 11 is provided with the object specifying portion 14, the relative information calculation portion 20, the time-to-collision calculation portion 30, and the support management portion 50. Alternatively, if information that the driving support portion requires can be acquired, some of or all of the object specifying portion, the relative information calculation portion, the time-to-collision calculation portion, and the support management portion can be processed by different devices.

This improves a configuration flexibility of the driving support device.

The above embodiments exemplify a case where the driving support device is provided in the vehicle 10. Alternatively, the driving support device may be configured such that a part of the driving support portion, a part of or all of the vehicle outside information acquisition portion, and the like are provided in a place other than the vehicle. A function that substitutes a part of the driving support portion, or some or all of the functions of the vehicle outside information acquisition portion may be provided in an external device such as a portable information processor. Then, the driving support device may be able to acquire necessary information from the portable information processor.

For example, in a case where the portable information processor is a smartphone, various processes may be performed by execution of application programs. Further, the smartphone may detect an object based on traffic information or the like that can be acquired through the Internet.

This improves the configuration flexibility of the driving support device.

The above embodiments exemplify a case where the driving support device is provided in the vehicle 10. Alternatively, the driving support device may be provided in a movable body except the vehicle, e.g., a vessel or a robot. This attains expansion of an application range of the driving support device.

DESCRIPTION OF THE REFERENCE NUMERALS

10 . . . vehicle, 11 . . . driving support portion, 12 . . . HMI, 13 . . . intervention control device, 14 . . . object specifying portion, 15 . . . vehicle outside information acquisition portion, 18 . . . vehicle information acquisition portion, 20 . . . relative information calculation portion, 21 . . . velocity calculation portion, 22 . . . braking time calculation portion, 23 . . . lateral change amount calculation portion, 24 . . . position determination portion, 30 . . . time-to-collision calculation portion, 31 . . . TTC calculation portion, 40 . . . storage portion, 41 . . . suppression period, 50 . . . support management portion, 51 . . . estimation portion, 52 . . . adjustment portion, 60 . . . leading vehicle, 61 . . . guardrail, 151 . . . in-vehicle camera, 152 . . . millimeter wave radar, 153 . . . transmitter, 181 . . . velocity sensor, 182 . . . acceleration sensor, 183 . . . yaw rate sensor, 184 . . . accelerator sensor, 185 . . . brake sensor, 186 . . . steering sensor, L . . . inter-vehicle distance, Lb . . . braking boundary line, Le . . . caution line, Ls . . . steering boundary line, T1 . . . steering time, T2 . . . caution time, Ta . . . time-to-collision, Tb . . . braking time, V1, V2 . . . velocity, Vr . . . relative velocity, Vy . . . relative lateral velocity, LLt . . . left turning locus line, LRt . . . right turning locus line, TH1 . . . activation threshold, TH2 . . . level threshold.

The invention claimed is:

1. A driving support device that performs a notification to a driver of a vehicle to avoid collision with an object present in a travelling direction of the vehicle based on a first time-to-collision as a time until the vehicle and the object collide with each other, the driving support device comprising:
   a storage device comprising:
      a first storage portion in which a steering time is stored as a time required for the vehicle to avoid the object by steering; and
      a second storage portion in which an activation threshold is stored as a threshold used to determine whether notification to the driver is performed based on the lateral relative time-dependent change amount detected by the lateral change detection portion; and
   a processor, wherein the storage device comprises computer readable instructions which, when executed by the processor cause the driving support device to:
      detect a lateral relative time-dependent change amount between the vehicle and the object in a lateral direction perpendicular to the travelling direction of the vehicle;
      restrain, in a condition when the first time-to-collision is greater than or equal to the steering time, the performing of the notification to the driver when the lateral relative time-dependent change amount detected is greater than or equal to the activation threshold; and
      when it is determined to restrain the performing of the notification to the driver, replace the steering time with a second time-to-collision obtained according to a position at which the object enters the target region,
   wherein
      the target region is defined ahead of the vehicle in the travelling direction, the target region being sectioned by a front part of the vehicle and movement loci of right and left front edges of the vehicle, the movement loci being based on steering of the vehicle over the steering time.

2. The driving support device according to claim 1, wherein
   the computer readable instructions when executed by the processor further cause the driving support device to detect a relative lateral velocity that is a relative moving velocity of the object in the lateral direction, as the lateral relative time-dependent change amount between the vehicle and the object.

3. The driving support device according to claim 2, wherein
   a relative lateral acceleration that is a relative acceleration at a time when the object moves in the lateral direction relative to the vehicle is used together with the relative moving velocity as the relative time-dependent change amount detected.

4. The driving support device according to claim 1, wherein
   the computer readable instructions when executed by the processor further cause the driving support device to acquire a braking time that is a time required for the vehicle to perform collision avoidance by braking, and to restrain the performing of the notification to the driver, with a proviso that the lateral relative time-dependent change amount detected when the first time-to-collision is the steering time or more is the activation threshold or more, and that the first time-to-collision is less than the braking time.

5. The driving support device according to claim 4, wherein
the braking time is acquired based on a relative velocity between the vehicle and the object.

6. The driving support device according to claim 4, wherein
the computer readable instructions when executed by the processor further cause the driving support device to adjust a period during which the performing of the notification to the driver is restrained, based on a magnitude of the relative time-dependent change amount detected by the lateral change detection portion.

7. The driving support device according to claim 6, wherein
the period during which the performing of the notification to the driver is restrained is adjusted to be longer as a magnitude of the relative time-dependent change amount detected by the lateral change detection portion is larger.

8. The driving support device according to claim 1, wherein:
the vehicle comprises a yaw rate sensor configured to detect a velocity at which a rotation angle in a turning direction of the vehicle changes; and
the computer readable instructions when executed by the processor further cause the driving support device to correct the detected relative time-dependent change amount of the object based on the detected velocity at which the rotation angle changes.

9. The driving support device according to claim 1, wherein a relative lateral acceleration that is a relative acceleration at a time when the object moves in the lateral direction relative to the vehicle is used as the relative time-dependent change amount detected.

10. A driving support method for performing a notification to a driver of a vehicle to avoid collision with an object present in a traveling direction of the vehicle based on a first time-to-collision as a time until the vehicle and the object collide with each other, the driving support method comprising:
a lateral change detection step of detecting a lateral relative time-dependent change amount between the vehicle and the object in a lateral direction perpendicular to the travelling direction of the vehicle; and
a support management step of restraining, performed by a processor, comprising in a condition when the first time-to-collision is greater than or equal to a steering time, performing of the notification to the driver based on the steering time and an activation threshold, the performing of the notification to the driver being restrained when the lateral relative time-dependent change amount detected is greater than or equal to the activation threshold, the steering time being stored in a storage portion and being a time required for the vehicle to avoid the object by steering, and the activation threshold being a threshold used to determine whether the notification to the driver is performed based on the lateral relative time-dependent change amount detected in the lateral change detection step,
wherein
a target region is defined ahead of the vehicle in the travelling direction, the target region being sectioned by a front part of the vehicle and movement loci of right and left front edges of the vehicle, the movement loci being based on steering of the vehicle over the steering time; and
the support management step of restraining further comprises replacing the steering time with a second time-to-collision obtained according to a position at which the object enters the target region, when it is determined to restrain the performing of the notification to the driver.

* * * * *